May 13, 1969  O. A. PETERSON  3,443,794

AGITATOR SHAFT STEADY BEARING

Filed Jan. 3, 1967

INVENTOR
OSCAR A. PETERSON
BY Morris Wiseman
ATTORNEY

United States Patent Office 3,443,794
Patented May 13, 1969

3,443,794
AGITATOR SHAFT STEADY BEARING
Oscar A. Peterson, Washington Township, Bergen County, N.J., assignor to Halcon International, Inc., a corporation of Delaware
Filed Jan. 3, 1967, Ser. No. 606,910
Int. Cl. B01f 7/18; F16c 1/26, 17/00
U.S. Cl. 259—1                                    7 Claims

ABSTRACT OF THE DISCLOSURE

This invention relates to means for providing a steady bearing for the free end of a rotatable shaft. The invention comprises an annular bushing means about the free end of a rotatable shaft, in combination with an annular bearing means adapted to receive the annular bushing means in slidable engagement. The invention permits ready access and maintenance or replacement of bushing and bearing components as well as seals generally provided at the upper end of the shaft by permitting the shaft to be moved along its longitudinal axis, generally vertically, a limited distance, thereby disengaging the bushing and bearing means.

Background of the invention

This invention relates to means for providing a steady bearing for the free end of a rotatable shaft. More particularly the invention relates to the combination of the free end of a rotatable shaft having annular bushing means provided thereon and annular bearing means adapted to receive said annular bushing means in slidable engagement.

Generally, in the field of chemical engineering process equipment, agitating or mixing means comprising shafting with propeller means attached have proven very useful over a wide range of liquid and solid mixtures. Such means are satisfactory for suspension and for intimate mixing of materials of thin and medium consistency of all kinds in batches of all sizes and are faster than paddles for most dissolving operations. However, a common problem attendant the use of such means is the inefficiency and loss of power attributable to vibration and sway of the shafting where the construction involves a free end. Particularly is this so in large fluid containers and vessels where the agitator or mixing means comprises a very long shaft. Accordingly, bearing means are required to minimize such sway and introduce some degree of steadiness to the unit operation. One of the more prominent prior art means for providing a steady bearing for an agitator shaft comprises a rod-like guide having a bearing sleeve thereon. The free end of the shaft used in combination with this bearing is provided with a coaxial port adapted to receive the bearing means in slidable engagement, the shaft walls defining the port being provided with bushing means for minimizing wear and friction. One of the obvious disadvantages of such construction is that where the upper portion of the shaft is fitted with one or more seals, for example, as where an hermetic seal is required, inspection, repair or replacement of such seals requires the shaft to be raised in order to disengage such components, thus requiring the physical separation of the shaft from the bearing means. Other attempts to steady an agitator shaft at its free end by means of bearing constructions and arrangements have been attended by similar as well as additional disadvantages including the necessity for rendering the fluid container or vessel inoperative for considerable periods of time to permit oftentimes complicated and difficult mechanical re-assembly and realignment of the bearing and bushing assemblies.

Accordingly, one of the principle objects of the present invention is to provide in combination a rotatable shaft and a steady bearing which is unattended by the foregoing disadvantages of the prior art.

Another object of the invention is to provide a bearing construction in combination with the free end of a rotatable shaft which readily permits raising or otherwise longitudinally moving the shaft a limited distance without the necessity of disengaging the free end of the shaft from the bearing.

A further object of the invention is to provide a bushing-bearing construction in combination with the free end of a rotatable shaft which permits maintenance, repair or replacement of component parts without the necessity of raising or otherwise longitudinally moving the shaft.

The above and other objects of the invention may be achieved by the apparatus, construction, arrangement, combinations and sub-combinations comprising the present invention, hereinafter discussed in the following detailed description and illustrated in the accompanying drawings.

Summary of the invention

In general, the invention comprises in combination with the free end of a rotatable shaft an annular bushing assembly fitted onto said free end, and slidably inserted within an annular bearing assembly which is mounted upon a support normally affixed to the inner wall or floor of a fluid container or vessel. The bushing assembly comprises a bushing mounting sleeve which is fitted onto the free end of a shaft in such manner that it is in contiguous engagement with such free end for a limited longitudinal distance from the transverse free end face of the shaft. A plurality of alternating bushing rings and spacer rings are mounted on the bushing sleeve in such manner that they contiguously circumscribe such sleeve along its entire length. The bushing rings may comprise glass-filled Teflon or any suitable wear-resistant, friction reducing bushing material and are so constructed as to radially extend beyond the periphery of the spacer rings and the shaft. Preferably, the bushing assembly, comprising the aforementioned bushing sleeve in combination with the plurality of bushing rings and spacer rings, is fitted onto a reduced diameter section of the free end of the shaft and, preferably, extends longitudinally beyond such free end. In the latter case, desirably, an end cap is employed to retain the bushing assembly on the shaft. In such case, the end cap comprises a reduced diameter section and main section having radial extensions corresponding to the reduced diameter and main sections of the shaft, whereby the bushing assembly may be seated in the annular groove formed about the end cap. Biasing of such cap against the bushing assembly in the direction of the shaft, as by the tightening of connecting means such as a bolt or bolts provides a clamping action on the bushing assembly by abutting shaft and cap shoulders. The use of a jack-washer on a bolt and interposed in the space between the shaft end and the end cap permits ready removal of the end cap and bushing assembly. The bearing assembly comprises a bearing sleeve cylindrical in shape and having an inner diameter sufficient to afford customary bearing clearance with the outer periphery of the bushing rings of the bushing assembly. It is usual practice to allow approximately 0.001 inch clearance per inch of shaft diameter. The bearing sleeve is supported by a guide tube in surrounding engagement therewith which extends longitudinally some distance beyond the receiving end of the bearing sleeve, the latter being preferably bevelled or chamfered outward to facilitate reception of the shaft end. The distance which the guide tube extends beyond the bearing sleeve receiving end should be sufficient to permit longitudinal travel of the shaft such that shaft seals may be maintained, repaired or replaced without completely removing the free end of the shaft from the guide tube. In accordance with the inventive construction, seal maintenance may be easily carried out with a minimum expenditure of time and effort without the necessity of dismantling the bearing and/or realligning the shaft insofar as the steady bearing and alignment therewith. The guide tube, at its other end, preferably has a radially outward flange suitably bored and adapted for mounting on a support. While the bearing sleeve is fixably connected, as by a plurality of screws radially joining the sleeve to the guide tube, preferably, the bearing sleeve also has a radially outward flange at its other end which is abutted by the other end of the guide tube. In such case secure retention of the bearing sleeve is effected. Desirably, the guide tube flange has a lip corresponding to an extension of the tube which abuts the bearing sleeve flange. In such case, the support for the bearing assembly comprising the bearing sleeve and the guide tube is adapted to seat such assembly, the guide tube lip and bearing sleeve flange insuring coaxial alignment with the shaft. The support means on which the bearing assembly is seated may suitably comprise a tripod or truncated cone which is affixed to the inner wall or floor of a fluid container or vessel. In some cases it is desirable to attach a flush cap to the bearing support, coaxially alligned with the shaft. The flush cap may have one or more apertures therethrough functioning as an hydraulic brake on the shaft during engagement and disengagement with the bearing assembly.

Since the inventive construction is designed primarily for use under liquid immersion conditions, contamination, reaction and housekeeping considerations dictate the employment of oilless or self-lubricating bearings. Such bearings contain within themselves sufficient lubrication to assure continuous service and include the bronze and graphite type, which is constructed of high-grade Phosphor bronze into which are cast symmetrical grooves for graphite; the hardwood, lubricant-impregnated type, which is made of hard seasoned wood, thoroughly impregnated with a specially prepared lubricating compound; and the metaline type, which is constructed of either Phosphor-bronze or gun-metal-bronze and into which are inserted small diameter metaline plugs. The latter are a mixture of graphite and antifriction metals. The oilless bearing is particularly adaptable for high-speed spindles and in the cotton and textile industries, generally, where cleanliness is a feature.

While the invention does not reside in any particular material of construction and, accordingly, embraces any and all suitable materials, it is known that cold-finished steel shafting is widely employed because of economical and strength considerations and such shafting is generally preferred. Illustrative thereof is cold-finished screw stock S.A.E. 1112 or 1120 and cold-finished 35/45 carbon S.A.E. 1040. As frequently occurs, however, slow speed, heavy loads and shocks are encountered and where such operation is contemplated, it is necessary to use S.A.E. alloy steels, e.g., cold-finished annealed 35/45 carbon alloy, S.A.E. 3140, 2340 and 6140.

Referring more particularly to the drawing wherein like reference characters designate like parts throughout the views, the constructions and combination embodying the invention is illustrated in the following figures wherein

Description of the preferred embodiment

Figure 1:
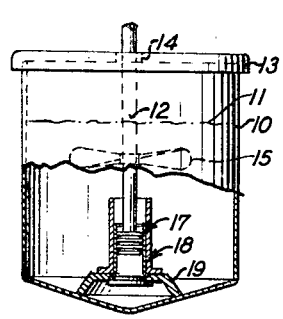
FIG. 1 is a plan view depicting the inventive construction in an environmental setting, in this case, and a typical fluid mixing vessel.

Referring to FIG. 1 of the drawing, a mixing vessel 10 is shown containing a liquid 11. A shaft 12 extends vertically through an hermetic seal 14 in lid 13 and into liquid 11. A propeller 15 is attached to the main section of shaft 12 beneath the surface of liquid 11. A reduced diameter section 16, on the free end of shaft 12, has mounted thereon in surrounding engagement a bushing assembly 17. The free end of shaft 12 including the reduced diameter section 16 surrounded by bushing assembly 17 is slidably inserted within bearing assembly 18. A truncated conical support 19 is affixed to the bottom of vessel 10 and bearing assembly 18 is seated thereon.

Figure 2:
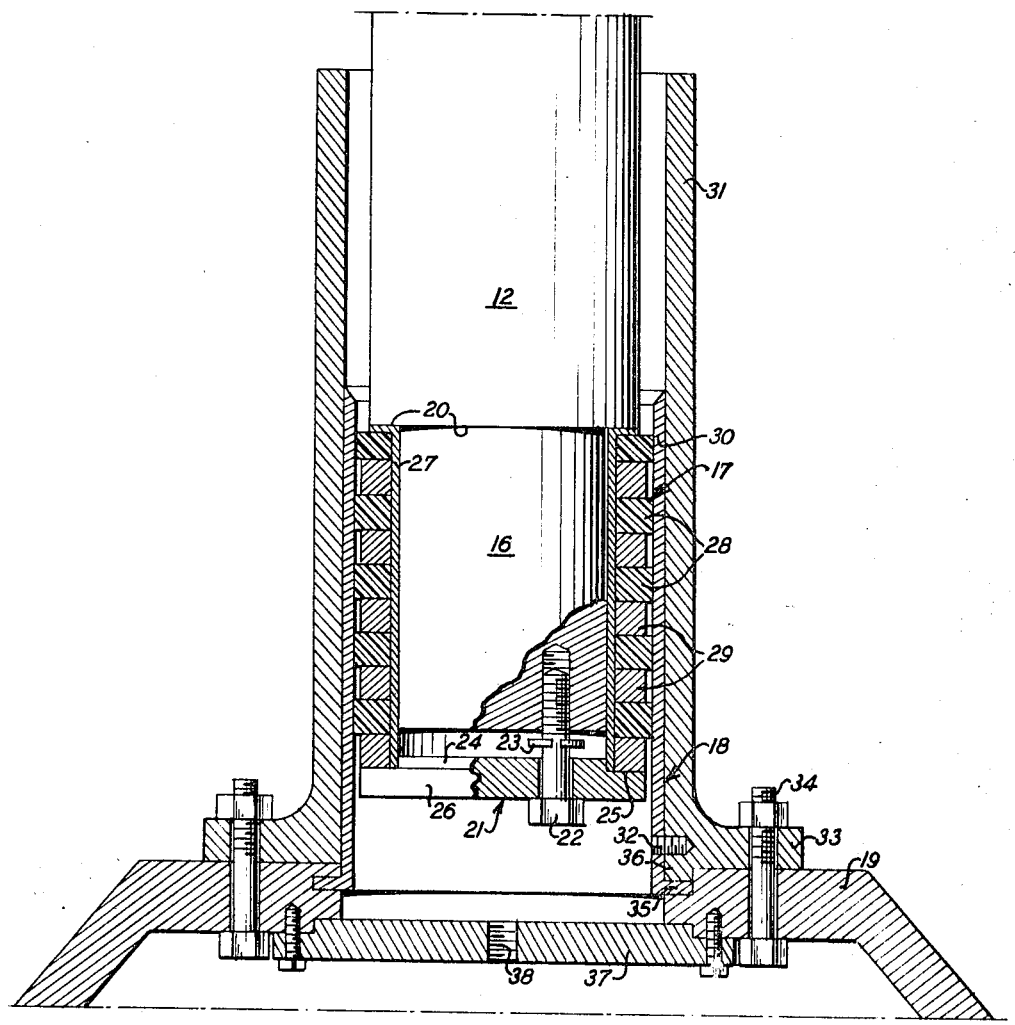
FIG. 2 is an exploded fragmentary sectional view in elevation of the inventive construction.

A more detailed view of the inventive bushing-bearing construction combination is depicted in FIG. 2. In the preferred embodiment shown here it may be seen that the shaft reduced diameter section 16 terminates in a shoulder 20 formed by the shaft main section 12. An end cap 21 is coaxially juxtaposed in spatial relationship with the free end of shaft 12 and is connected thereto by at least one bolt 22 having a jack-washer 23 thereon interposed between end cap 21 and the free end of shaft 12. End cap 21 comprises a reduced diameter section 24 terminating in a shoulder 25 formed by a main section 26. Bushing assembly 17 abuts shaft shoulder 20 and cap shoulder 25 extending longitudinally therebetween, and comprises bushing sleeve 27 continguously circumscribed by a plurality of alternating bushing rings 28 and spacer rings 29. Bushing rings 28 extend radially beyond the periphery of spacer rings 29 and the main section of shaft 12 and are adapted for slidable insertion within bearing assembly 18. Bearing sleeve 30 is supported and surroundingly engaged by guide tube 31 to which it is fixedly attached by screws 32. Guide tube 31 extends longitudinally beyond the receiving end of bearing sleeve 30 a sufficient distance to permit maintenance of seal 14 without complete removal of the free end of shaft 12 from guide tube 31. The other end of guide tube 31 has a radially outward flange 33 for mounting upon support 19. For this purpose aligning bores are provided in flange 33 and support 19 to permit connection by bolts 34. Retention of bearing sleeve 30 by guide tube 31 is insured by the provision of flange 35 on the other end of bearing sleeve 30. A lip 36 on flange 33 corresponding to an extension of guide tube 31 abuts flange 35 to provide a positive longitudinal stop. Further, the extension provided by lip 36 and flange 35 is mated with support 19, thereby providing a positive seat on support 19 and insuring coaxial alignment with shaft 12. Flush cap 37 with at least one aperture 38 therethrough is attached to support 19 and coaxially aligned with shaft 12. Flush cap 37 provides an hydraulic braking action on the free end of shaft 12 upon slidable insertion within bearing assembly 18, thereby permitting controlled engagement and prevention of damage that may occur upon too rapid and forceful insertion.

It is to be understood that the specific embodiments set forth hereinbefore are presented for purposes of explanation and illustration and the various modifications thereof without departing from the spirit and scope of the invention may be otherwise embodied or practiced.

What is claimed is:
1. In combination with a rotatable shaft having a free end,
   a reduced diameter section extending from said free end along the longitudinal axis of said shaft and terminating at a shoulder formed by the main section of said shaft,
   a retaining cap coaxially juxtaposed in spatial relationship with said free end and comprising in sequence a reduced diameter section terminating at a shoulder formed by a main section, said cap sections having radial extensions equal to the corresponding shaft sections,
   a bushing assembly abutting at its ends the shoulders of said shaft and cap and contiguously circumscribing said reduced diameter sections therebetween, said bushing assembly comprising a bushing sleeve contiguously circumscribed by a plurality of alternating bushing rings and spacer rings along the entire length thereof, said bushing rings extending radially beyond said spacer rings and beyond the main section of said shaft, and a bearing assembly comprising a bearing sleeve having an end receiving the free end of said shaft in slidable insertion and thereby effecting contact between the inner periphery of said bearing sleeve and the outer periphery of said bushing rings, and a guide tube contiguously circumscribing said bearing sleeve and removably attached thereto, one end of said guide tube extending longitudinally beyond the receiving end of said bearing sleeve and the other end of said guide tube having a flange adapted for mounting on a support.

2. A combination according to claim 1 wherein the other end of said bearing sleeve has a flange which abuts the other end of said guide tube.

3. A combination according to claim 2 wherein said guide tube flange has a lip corresponding to an extension of said guide tube and said bearing sleeve flange abuts said lip.

4. A combination according to claim 3 wherein said cap and shaft are removably connected in such manner that said bushing assembly is securely clamped between the shoulders of said cap and shaft.

5. A combination according to claim 4 wherein at least one bolt connects said cap and shaft and a jack-washer is interposed between said cap and shaft on said bolt.

6. A combination according to claim 5 including a vessel, said support being attached therewithin.

7. A combination according to claim 6 including at least one propeller attached to the main section of said shaft.

References Cited

UNITED STATES PATENTS

| | | | |
|---|---|---|---|
| 525,138 | 8/1894 | Detwiler | 259—107 |
| 735,206 | 8/1903 | Burrows | 259—107 |
| 1,350,553 | 8/1920 | Mack | 277—125 X |
| 1,923,040 | 8/1933 | Pippin | 92—252 X |
| 2,082,796 | 6/1937 | Gaertner | 259—107 |
| 2,145,553 | 1/1939 | Morin | 308—4 X |
| 2,991,003 | 7/1961 | Petersen | 92—252 X |
| 2,253,416 | 8/1941 | Caldwell | 308—238 X |
| 2,406,891 | 9/1946 | Newton | 308—161 X |
| 2,657,912 | 11/1953 | Liebman | 259—107 |
| 2,865,615 | 12/1958 | Slaughter | 259—107 |
| 3,039,834 | 6/1962 | Howe | 308—4 |
| 3,107,953 | 10/1963 | Palm | 308—238 X |
| 3,149,543 | 9/1964 | Naab | 92—252 X |
| 3,179,057 | 4/1965 | Cosner | 308—40 X |
| 3,304,136 | 2/1967 | Muller | 308—36.1 |
| 3,353,456 | 11/1967 | Bauer | 92—258 |

FOREIGN PATENTS 537,419  5/1955  Belgium.

EDGAR W. GEOGHEGAN, *Primary Examiner.*

LUCIOUS L. JOHNSON, *Assistant Examiner.*

U.S. Cl. X.R.

259—107; 308—4, 36.1